ized

UNITED STATES PATENT OFFICE 2,520,438

BIS(4-AMINOPHENYL)-SULFONE ASCORBATE

Peter P. T. Sah, San Francisco, Calif., assignor to Eli Lilly and Company, Indianapolis, Ind., a corporation of Indiana No Drawing. Application November 17, 1949, Serial No. 127,997

1 Claim. (Cl. 260—239.65)

This invention relates to the di-l-ascorbate of bis(4-aminophenyl)-sulfone, a new chemical compound possessing a high degree of bactericidal effectiveness against microorganisms, inter alia *Mycobacterium tuberculosis* and *Mycobacterium leprae*, and characterized by remarkably low toxicity.

The new chemical compound is prepared as follows:

24.8 g. (0.1 mol) of pure bis(4-aminophenyl)-sulfone are added to a solution of 35.2 g. (0.2 mol) of pure l-ascorbic acid in 150 cc. of boiling methanol. The mixture is refluxed for 10 minutes and 300 cc. of chloroform are added. On standing, white, slightly water-soluble crystals of the di-l-ascorbate of bis(4-aminophenyl)-sulfone separate. The crystals are filtered off and purified by recrystallization from methanol. M. P. 163–165° C. Analysis: found, 4.84 percent nitrogen; calculated, 4.97 percent.

I claim:

As a new chemical compound, the di-l-ascorbate of bis(4-aminophenyl)-sulfone.

PETER P. T. SAH.

No references cited.